United States Patent
Kuo (10) Patent No.: US 8,634,340 B2
(45) Date of Patent: Jan. 21, 2014

(54) METHOD AND APPARATUS FOR PDCCH ALLOCATION IN WIRELESS COMMUNICATION SYSTEM

(75) Inventor: Richard Lee-Chee Kuo, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 228 days.

(21) Appl. No.: 12/848,240

(22) Filed: Aug. 2, 2010

(65) Prior Publication Data

US 2011/0026449 A1 Feb. 3, 2011

Related U.S. Application Data

(60) Provisional application No. 61/230,741, filed on Aug. 2, 2009.

(51) Int. Cl.
*H04B 7/212* (2006.01)
*H04Q 7/00* (2006.01)
*H04W 4/00* (2009.01)
*H04W 24/00* (2009.01)

(52) U.S. Cl.
USPC ........ 370/322; 370/329; 370/331; 455/422.1; 455/425

(58) Field of Classification Search
None
See application file for complete search history.

(56) References Cited

U.S. PATENT DOCUMENTS

2010/0303011 A1* 12/2010 Pan et al. ............... 370/328

OTHER PUBLICATIONS

3GPP TR 36.814 V1.2.0 (Jun. 2009).
3GPP, R2-093727, "Impact of CoMP on Control Plane", Jun. 2009.
3GPP, R2-094077, "Baseline CR capturing MBMS agreements affecting 36.331", Jun. 2009.
3GPP TS 36.331 V8.6.0 (Jun. 2009), "E-UTRA RRC Protocol Specification (Release 8)".
3GPP TS 36.321 V8.6.0 (JUn. 2009), "E-UTRA MAC Protocol Specification (Release 8)".
3GPP TSG RAN WG1 Meeting #58 R1-09xxxx Draft Report of 3GPP TSG RAN WG1 #57bis v0.1.0., Jun. 2009.

(Continued)

*Primary Examiner* — Xavier S. Wong
(74) *Attorney, Agent, or Firm* — Blue Capital Law Firm, P.C.

(57) ABSTRACT

A method for PDCCH allocation in a network terminal of a wireless communication system is disclosed. The wireless communication system supports Carrier Aggregation, which enables a UE of the wireless communication system to perform transmission and/or reception through multiple carriers. The method includes steps of configuring a plurality of carriers to a UE via an RRC message, and including an information for each configured carrier in the RRC message to indicate a second carrier which carries the Physical Downlink Control Channel (PDCCH) corresponding to a first carrier, wherein the PDCCH on the second carrier is used to transmit downlink assignment or uplink grant for the first carrier.

24 Claims, 5 Drawing Sheets

(56) References Cited

OTHER PUBLICATIONS

3GPP, R2-093929 "RACH-less handover in CoMP", Jun. 2009.
InterDigital: "Multiple Component Carriers and Carrier Indication", 3GPP TSG-RAN WG1 Meeting #57bis, R1-092589, Jun. 29-Jul. 3, 2009, XP050351085, Los Angeles, CA, USA.
NEC: "Details on Carrier Aggregation Signaling", 3GPP TSG-RAN WG2 #66bis, R2-094003, Jun. 29-Jul. 3, 2009, pp. 1/3-3/3, XP050352173, Los Angeles, USA.
CMCC: "Resource Allocation and PDCCH Design Issues in Carrier Aggregation", 3GPP TSG-RAN WG1 #56, R1-090924, Feb. 9-13, 2009, XP050318765, Athens, Greece.
Catt: "DL Control Channel Scheme for LTE-A", 3GPP TSG RAN WG1 Meeting #57, R1-091994, May 4-8, 2009, XP050339464, San Francisco, USA.
Huawei: "Component Carrier Management with DRX Consideration in LTE-Advanced", 3GPP TSG-RAN WG2 Meeting #66bis, R2-093922, Jun. 29-Jul. 3, 2009, XP050352115, Los Angeles, USA.
Fujitsu: "Anchor component carrier and preferred control signal structure", 3GPP TSG-RAN1 #56bis, R1-091503, Jan. 23-27, 2009, pp. 1/5-5/5, XP050339062, Seoul, ROK.
Texas Instruments: "Downlink and Uplink Control to Support Carrier Aggregation", 3GPP TSG RAN WG1 #57, R1-092198, May 4-8, 2009, pp. 1/5-5/5, XP050339627, San Francisco, USA.
Search Report on corresponding EP Patent Application No. 10008058.9 dated Dec. 27, 2010.

* cited by examiner

METHOD AND APPARATUS FOR PDCCH ALLOCATION IN WIRELESS COMMUNICATION SYSTEM

CROSS REFERENCE TO RELATED APPLICATIONS

This application claims the benefit of U.S. Provisional Application No. 61/230,741, filed on Aug. 2, 2009 and entitled "Method and apparatus for improving handover in CoMP in a wireless communication system", the contents of which are incorporated herein by reference.

BACKGROUND OF THE INVENTION

1. Field of the Invention

The present invention relates to a method and apparatus for Physical Downlink Control Channel (PDCCH) allocation in a wireless communication system, and more particularly, to a method and apparatus capable of reducing power consumption and computing complexity.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in base stations (Node Bs) alone rather than in Node Bs and RNC (Radio Network Controller) respectively, so that the system structure becomes simple.

However, to meet future requirements of all kinds of communication services, the 3rd Generation Partnership Project (3GPP) has started to work out a next generation of the LTE system: the LTE Advanced (LTE-A) system. Carrier aggregation (CA), where two or more component carriers are aggregated, is introduced into the LTE-A system in order to support wider transmission bandwidths, e.g. up to 100 MHz and for spectrum aggregation. In the LTE-A system, a user equipment (UE) uses multiple component carriers to establish multiple links with a network terminal for simultaneously receiving and transmitting on each component carrier, so as to enhance transmission bandwidth and spectrum aggregation.

The network terminal configures a plurality of carriers to a UE via a radio resource control (RRC) message. After CA is configured, the UE receives Physical Downlink Shared Channels (PDSCHs) on a plurality of configured downlink component carriers. Besides, the prior art further proposes to monitor a Physical Downlink Control Channels (PDCCHs) on other downlink component carriers, for acquiring related scheduling information, i.e. downlink assignment or uplink grant, to perform data reception or transmission. In other words, PDSCH and PDCCH may be carried on different component carriers. Therefore, within the configured downlink component carriers, part of component carriers may only carry PDSCHs, and not carry PDCCHs; while another part of component carriers simultaneously carry PDSCHs and PDCCHs. In such a situation, the UE can acquire the scheduling for all the configured component carriers by merely monitoring PDCCHs on part of the component carriers. As a result, power consumption or requirements for computing capability can be reduced, because requirements for the computing capability mainly result from different carriers using different encoding methods, and thus the more the monitored component carriers are, the more complex the required blind decoding computing is. Correspondingly, requirements for computing capability can be reduced by reducing an amount of the monitored component carriers.

As can be seen from the above, by carrying PDSCHs and PDCCHs on different component carriers and transmitting PDCCHs only on part of component carriers, the amount of the monitored component carriers is reduced, and power consumption or requirements for computing capability can be reduced. However, this method still has some potential for improvement under some circumstances. For example, when a transmission fails and a retransmission is performed, packets for the retransmission are only transmitted on the original carrier. Therefore, in theory, the network terminal only needs to transmit scheduling information required for the retransmission on one PDCCH. However, according to the prior art, the UE still needs to monitor all PDCCHs, since the UE does not know the scheduling information is transmitted on which PDCCH, causing unnecessary power consumption.

Therefore, how to further reduce power consumption or requirements for computing capability for CA has become an issue in the industry.

SUMMARY OF THE INVENTION

It is therefore an objective of the present invention to provide a method and apparatus for Physical Downlink Control Channel (PDCCH) allocation in a wireless communication system.

The present invention discloses a method for Physical Downlink Control Channel (PDCCH) allocation in a network terminal of a wireless communication system. The wireless communication system supports a Carrier Aggregation (CA), which enables a user equipment (UE) of the wireless communication system to perform transmission and/or reception through multiple carriers. The method includes steps of configuring a plurality of carriers to a UE via a radio resource control (RRC) message, and including an information for each configured carrier in the RRC message, to indicate a second carrier which carries a PDCCH corresponding to a first carrier, wherein the PDCCH on the second carrier is used to transmit the downlink assignment or uplink grant for the first carrier.

The present invention further discloses a communication device for Physical Downlink Control Channel (PDCCH) allocation in a network terminal of a wireless communication system. The wireless communication system supports a Carrier Aggregation (CA), which enables a user equipment (UE) of the wireless communication system to perform transmission and/or reception through multiple carriers. The communications device includes a processor for executing a program, and a memory coupled to the processor for storing the program. The program includes steps of configuring a plurality of carriers to a UE via a radio resource control (RRC) message, and including an information for each configured carrier in the RRC message, to indicate a second carrier which carries a PDCCH corresponding to a first carrier, wherein the PDCCH on the second carrier is used to transmit the downlink assignment or uplink grant for the first carrier.

The present invention further discloses a method for Physical Downlink Control Channel (PDCCH) allocation in a user equipment (UE) of a wireless communication system. The wireless communication system supports a Carrier Aggregation (CA), which enables the UE to perform transmission and/or reception through multiple carriers. The method includes steps of receiving a radio resource control (RRC) message for configuring a plurality of carriers, wherein the RRC message comprises an information for each configured carrier, and the information is utilized for indicating a second carrier which carries a PDCCH corresponding to a first carrier; and monitoring the PDCCH on the second carrier according to the information, to acquire downlink assignment or uplink grant for the first carrier.

The present invention further discloses a communication device for Physical Downlink Control Channel (PDCCH) allocation in a user equipment (UE) of a wireless communication system. The wireless communication system supports a Carrier Aggregation (CA), which enables the UE to perform transmission and/or reception through multiple carriers. The communications device includes a processor for executing a program, and a memory coupled to the processor for storing the program. The program includes steps of receiving a radio resource control (RRC) message for configuring a plurality of carriers, wherein the RRC message comprises an information for each configured carrier, and the information is utilized for indicating a second carrier which carries a PDCCH corresponding to a first carrier, and monitoring the PDCCH on the second carrier according to the information, to acquire downlink assignment or uplink grant for the first carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
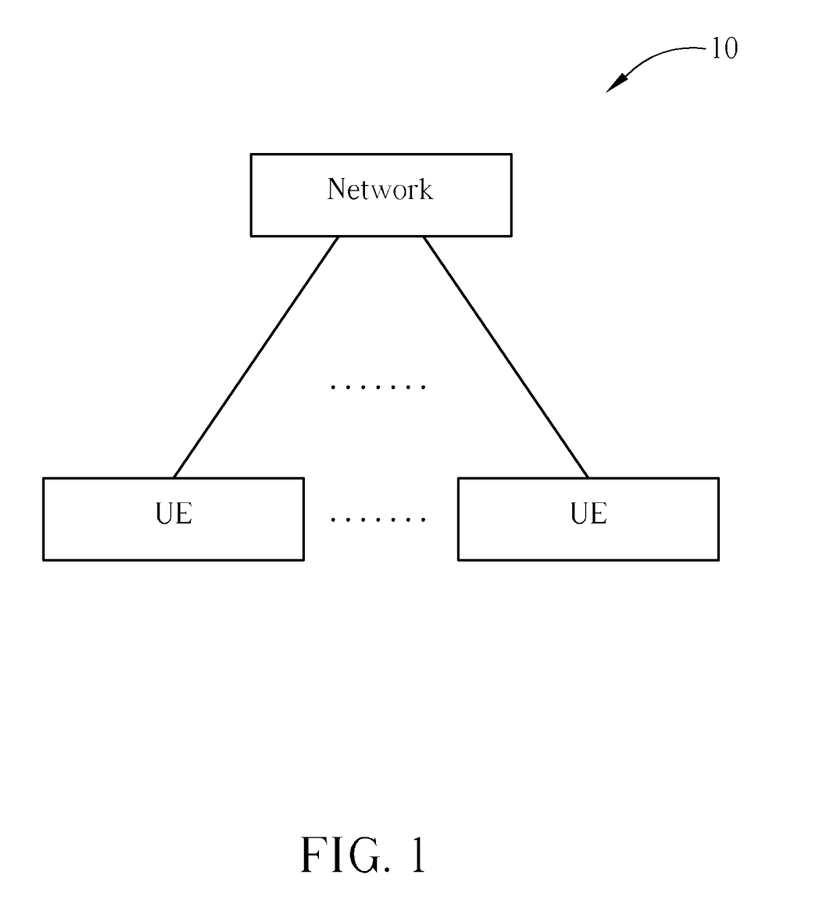
FIG. 1 is a schematic diagram of a wireless communications system.

Please refer to FIG. 1, which illustrates a schematic diagram of a wireless communication system 10. The wireless communication system 10 is preferably an LTE advanced (LTE-A) system, and is briefly composed of a network and a plurality of user equipments (UEs). In FIG. 1, the network and the UEs are simply utilized for illustrating the structure of the wireless communication system 10. Practically, the network may comprise a plurality of base stations (Node Bs), radio network controllers and so on according to actual demands, and the UEs can be devices such as mobile phones, computer systems, etc.

Figure 2:
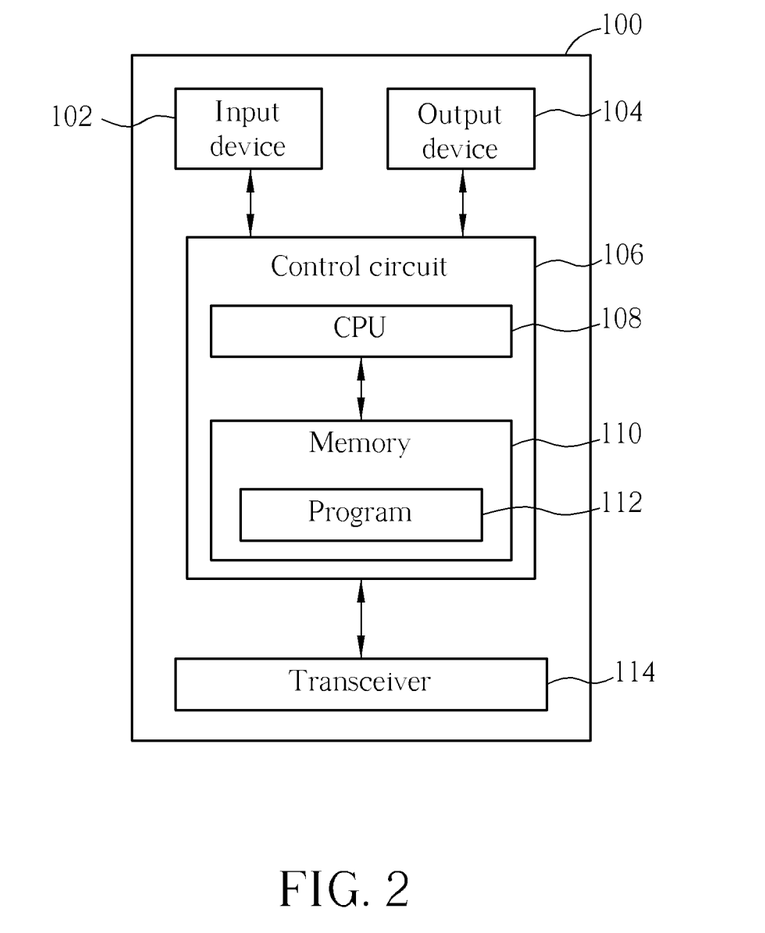
FIG. 2 is a function block diagram of a wireless communications device.

Please refer to FIG. 2, which is a functional block diagram of a communication device 100 in a wireless communication system. The communication device 100 can be utilized for realizing the network or the UEs in FIG. 1. For the sake of brevity, FIG. 2 only shows an input device 102, an output device 104, a control circuit 106, a central processing unit (CPU) 108, a memory 110, a program 112, and a transceiver 114 of the communication device 100. In the communication device 100, the control circuit 106 executes the program 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communication protocol framework, the transceiver 114 can be seen as a portion of Layer 1, and the control circuit 106 can be utilized to realize functions of Layer 2 and Layer 3.

Figure 3:
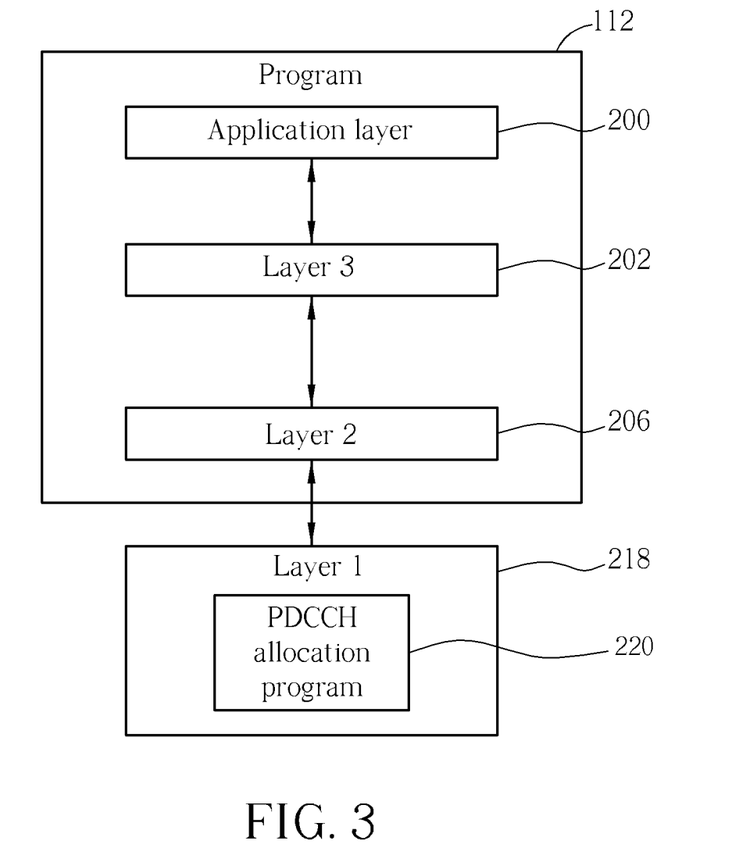
FIG. 3 is a diagram of a program of FIG. 2.

Please continue to refer to FIG. 3. FIG. 3 is a diagram of the program 112 shown in FIG. 2. The program 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

In LTE-A system, the Layer 1 218 and the Layer 2 206 may support a Carrier Aggregation (CA) technology, which enables the UE to perform transmission or reception through multiple carriers configured by the upper layer. In such a situation, the embodiment of the present invention provides a PDCCH allocation program 220 for reducing required power consumption and computing for the UE to monitor PDCCHs.

Figure 4:
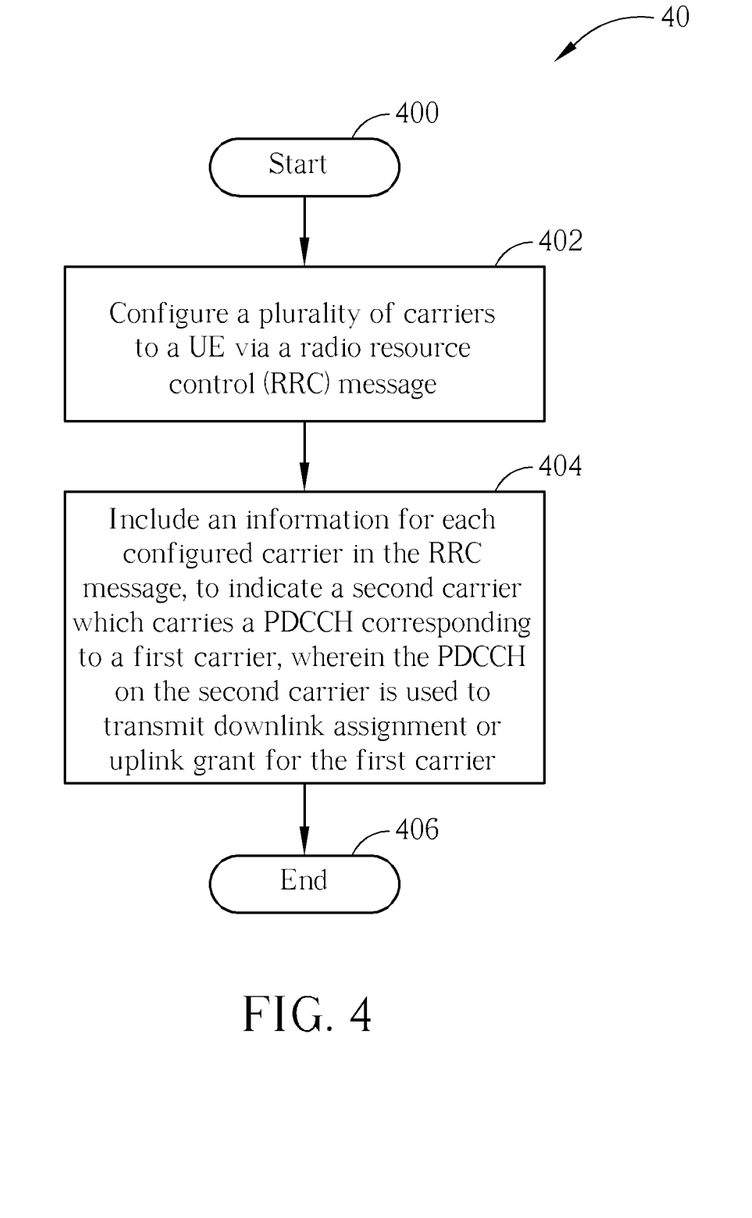
FIG. 4 is a flowchart of a process according to an embodiment of the present invention.

Please refer to FIG. 4, which is a schematic diagram of a process 40 according to an embodiment of the present invention. The process 40 is utilized for PDCCH allocation in a network terminal of the wireless communication system 10, and can be compiled into the PDCCH allocation program 220. The process 40 includes the following steps:

Step 400: Start.

Step 402: Configure a plurality of carriers to a UE via a radio resource control (RRC) message.

Step 404: Include an information for each configured carrier in the RRC message, to indicate a second carrier which carries a PDCCH corresponding to a first carrier, wherein the PDCCH on the second carrier is used to transmit downlink assignment or uplink grant for the first carrier.

Step 406: End.

According to the process 40, the network terminal configures a plurality of carriers to the UE via an RRC message, and the RRC message includes an information for each configured carrier. The information indicates a second carrier which carries a PDCCH corresponding to a first carrier, and the PDCCH is used to transmit the downlink assignment or uplink grant for the first carrier information. In such a situation, the UE can know which carrier carries the PDCCH corresponding to another carrier according to the information included in the RRC message and monitor the PDCCH correctly, so as to acquire the downlink assignment or the uplink grant for this carrier. In short, in the embodiment of the present invention, the downlink assignment or the uplink grant for each carrier is transmitted on a specific PDCCH, and a correlation between a carrier and a PDCCH can be known from the information in the RRC message sent by the network terminal. In such a situation, the UE only needs to monitor proper PDCCHs according to an operating status, and thus reduces power consumption and computing required by monitoring carriers. For example, when a transmission fails and a retransmission is performed, since packet for the retransmission is only transmitted on the original carrier, according to the embodiment of the present invention, the UE can know which PDCCH is corresponding to the carrier, and only monitor the PDCCH instead of monitoring all PDCCHs, to reduce power consumption and computing complexity.

More specifically, taking downlink operations as an example, assume that the network terminal configures five carriers CC1~CC5 to the UE via the RRC message, and the carriers CC1~CC3 simultaneously carry PDSCHs and PDCCHs, and the carriers CC4, CC5 only carry PDSCHs. Downlink assignment for the carrier CC4 is transmitted on the PDCCH on the carrier CC2, and downlink assignment of the carrier CC5 is transmitted on the PDCCH on the carrier CC3. Therefore, the carriers CC1~CC3 relate to the second carrier of the process 40, while the carriers CC4, CC5 relate to the first carrier. Furthermore, according to the embodiment of the present invention, the RRC message sent by the network terminal includes information, for indicating the UE a correlation between a carrier and a PDCCH. Therefore, if a transmission failure occurs on the carrier CC4 and a retransmission is performed, the UE only needs to monitor the PDCCH on the carrier CC2 without monitoring the PDCCHs on the carriers CC1 and CC3.

Noticeably, the above example is for downlink operations, and can be simply modified for uplink operations. In simplicity, for downlink operations, the first carrier carries a Physical Downlink Shared Channel (PDSCH), and the PDCCH on the second carrier transmits the downlink assignment for the first carrier; for uplink operations, the first carrier carries a Physical Uplink Shared Channel (PUSCH), and the PDCCH on the second carrier transmits the uplink grant for the first carrier.

On the other hand, the RRC message in the process 40 is preferably an RRC Connection Reconfiguration message. Besides, the first carrier and the second carrier are only utilized for indicating a relation in relative to a PDCCH, and can be identical or different carriers. In other words, the first carrier refers to a carrier which carries PDSCH or PUSCH, and the second carrier refers to a carrier which carries the PDCCH corresponding to the first carrier. If the first carrier and the second carrier are the same, a PDCCH carried on a carrier is utilized for transmitting downlink assignment or uplink grant for the same carrier. Moreover, the PDCCH can further include a carrier indication (CI) field, for indicating which carrier the downlink assignment or the uplink grant carried by the PDCCH is corresponding to. A bit length of the CI field can be 3 bits, or depends on an amount of carriers configured to the UE.

Figure 5:
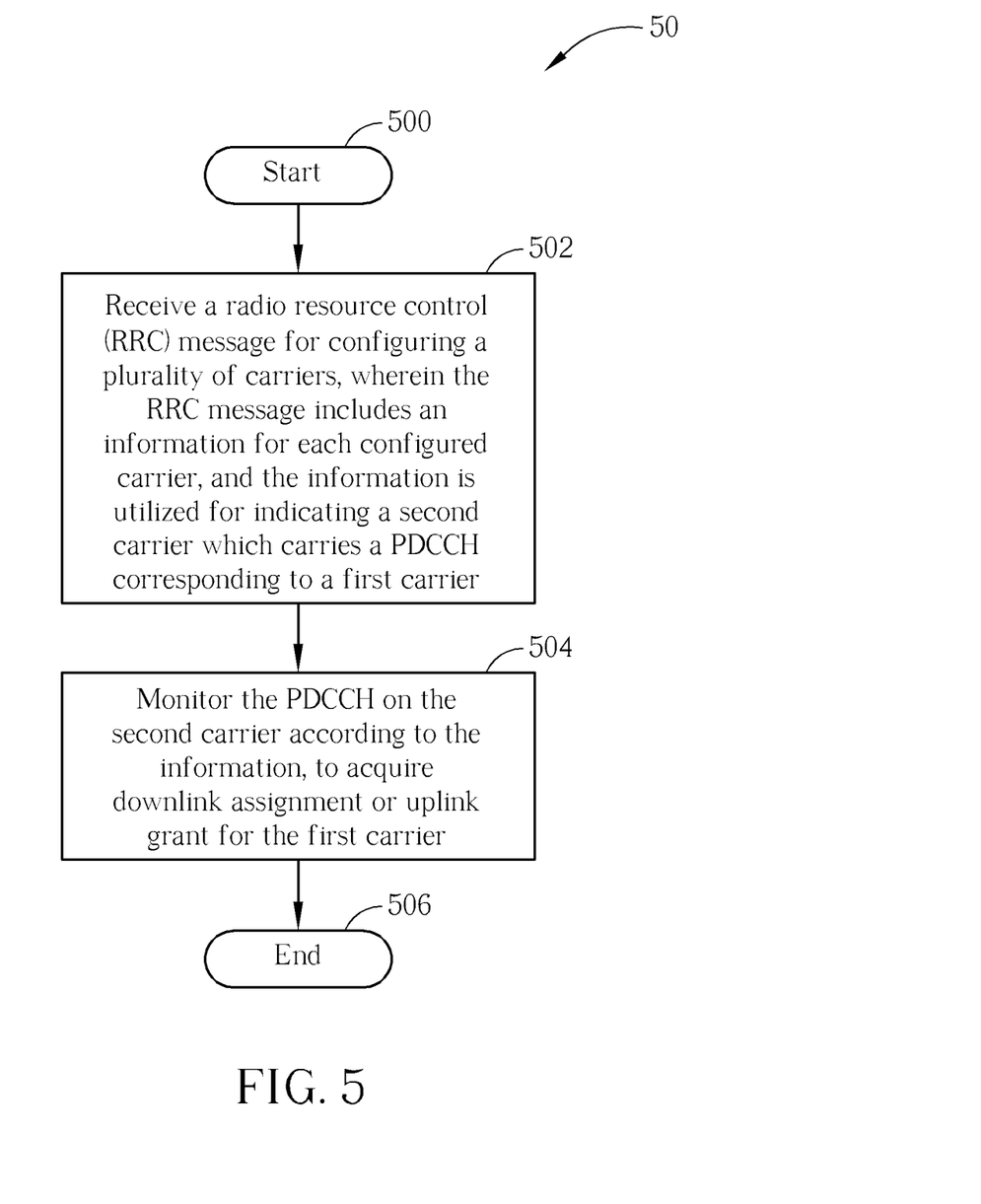
FIG. 5 is a flowchart of another process according to an embodiment of the present invention.

The above operations related to the UE can further be summarized into a process 50 as shown in FIG. 5. The process 50 is utilized for PDCCH allocation in a UE of the wireless communication system 10, and can be compiled into the PDCCH allocation program 220. The process 50 includes the following steps:

Step 500: Start.

Step 502: Receive a radio resource control (RRC) message for configuring a plurality of carriers, wherein the RRC message includes an information for each configured carrier, and the information is utilized for indicating a second carrier which carries a PDCCH corresponding to a first carrier.

Step 504: Monitor the PDCCH on the second carrier according to the information, to acquire downlink assignment or uplink grant for the first carrier.

Step 506: End.

The process 50 is derived from the process 40 for implementing operations of the UE, and detailed description and modifications can be referred to the above description, and are not narrated hereinafter.

Noticeably, the above realization of the steps in the processes 40, 50 should be well known by those skilled in the art. For example, the steps of the processes 40, 50 can be compiled as units into the PDCCH allocation program 220 by instructions, parameters, variables, etc. of specific programming languages.

To sum up, in the present invention, UE does not need to monitor all PDCCHs, and can reduce power consumption and computing complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for Physical Downlink Control Channel (PDCCH) allocation in a network terminal of a wireless communication system, the wireless communication system supporting a Carrier Aggregation (CA), which enables a user equipment (UE) of the wireless communication system to perform transmission and/or reception through multiple carriers, the method comprising:
   configuring a first carrier to a UE via a radio resource control (RRC) message; and
   including, in the RRC message, a carrier information for the first carrier to indicate a second carrier which carries a PDCCH corresponding to the first carrier,
   wherein the PDCCH on the second carrier is used to transmit downlink assignment or uplink grant for the first carrier, and a correlation between the first carrier, the second carrier and the PDCCH is derived from the carrier information included in the RRC message and is used to monitor the PDCCH.

2. The method of claim 1, wherein the second carrier can be identical to the first carrier.

3. The method of claim 1, wherein the first carrier carries a Physical Downlink Shared Channel (PDSCH) or a Physical Uplink Shared Channel (PUSCH).

4. The method of claim 1, wherein the RRC message is an RRC Connection Reconfiguration message.

5. The method of claim 1, wherein the PDCCH comprises a carrier indication (CI) field, for indicating the carrier corresponding to the downlink assignment or the uplink grant carried by the PDCCH.

6. The method of claim 5, wherein a bit length of the CI field is 3 bits.

7. A communication device for Physical Downlink Control Channel (PDCCH) allocation in a network terminal of a wireless communication system, the wireless communication system supporting a Carrier Aggregation (CA), which enables a user equipment (HE) of the wireless communication system to perform transmission and/or reception through multiple carriers, the communications device comprising:
   a processor for executing a program; and
   a memory coupled to the processor for storing the program;
   wherein the program comprises:
      configuring a first carrier to a UE via a radio resource control (RRC) message; and
      including, in the RRC message, a carrier information, for the first carrier to indicate a second carrier which carries a PDCCH corresponding to the first carrier,
      wherein the PDCCH on the second carrier is used to transmit downlink assignment or uplink grant for the first carrier, and a correlation between the first carrier, the second carrier, and the PDCCH is derived from the carrier information included in the RRC message and is used to monitor the PDCCH.

8. The communications device of claim 7, wherein the second carrier can be identical to the first carrier.

9. The communications device of claim 7, wherein the first carrier carries a Physical Downlink Shared Channel (PDSCH) or a Physical Uplink Shared Channel (PUSCH).

10. The communications device, of claim 7, wherein the RRC message is an RRC Connection Reconfiguration message.

11. The communications device of claim 7, wherein the PDCCH comprises a carrier indication (CI) field, for indicating the carrier corresponding to the downlink assignment or the uplink grant carried by the PDCCH.

12. The communications device of claim 11, wherein a bit length of the CI field is 3 bits.

13. A method for Physical Downlink Control Channel (PDCCH) allocation in a user equipment (UE) of a wireless communication system, the wireless communication system supporting a Carrier Aggregation (CA), which enables the UE to perform transmission and/or reception through multiple carriers, the method comprising:

receiving a radio resource control (RRC) message for configuring a first carrier, wherein the RRC message includes a carrier information for the first carrier, and the carrier information is utilized for indicating a second carrier which carries a PDCCH corresponding to the first carrier;

deriving a correlation between the first carrier, the second carrier, and the PDCCH from the carrier information included in the RRC message; and monitoring the PDCCH, using the correlation derived from the carrier information included in the RRC message, to acquire downlink assignment or uplink grant for the first carrier.

14. The method of claim 13, wherein the second carrier can be identical to the first carrier.

15. The method of claim 13, wherein the first carrier carries a Physical Downlink Shared Channel (PDSCH) or a Physical Uplink Shared Channel (PUSCH).

16. The method of claim 13, wherein the RRC message is an RRC Connection Reconfiguration message.

17. The method of claim 13, wherein the PDCCH comprises a carrier indication (CI) field, for indicating the carrier corresponding to the downlink assignment or the uplink grant carried by the PDCCH.

18. The method of claim 17, wherein a bit length of the CI field is 3 bits.

19. A communication device for Physical Downlink Control Channel (PDCCH) allocation in a user equipment (UE) of a wireless communication system, the wireless communication system supporting a Carrier Aggregation (CA), which enables the UE to perform transmission and/or reception through multiple carriers, the communications device comprising:

a processor for executing a program; and
a memory coupled to the processor for storing the program;
wherein the program comprises:

receiving a radio resource control (RRC) message for configuring a first carrier, wherein the RRC message includes a carrier information for the first carrier, and the carrier information is utilized for indicating a second carrier which carries a PDCCH corresponding to the first carrier;

deriving a correlation between the first carrier, the second carrier, and the PDCCH from the carrier information included in the RRC message; and monitoring the PDCCH, using the correlation derived from the carrier information included in the RRC message, to acquire downlink assignment or uplink grant for the first carrier.

20. The communications device of claim 19, wherein the second carrier can be identical to the first carrier.

21. The communications device of claim 19, wherein the first carrier carries a Physical Downlink Shared Channel (PDSCH) or a Physical Uplink Shared Channel (PUSCH).

22. The communications device of claim 19, wherein the RRC message is an RRC Connection Reconfiguration message.

23. The communications device of claim 19, wherein the PDCCH comprises a carrier indication (CI) field, for indicating the carrier corresponding to the downlink assignment or the uplink grant carried by the PDCCH.

24. The communications device of claim 23, wherein a bit length of the CI field is 3 bits.

* * * * *